(12) United States Patent
Lau

(10) Patent No.: US 12,472,210 B2
(45) Date of Patent: Nov. 18, 2025

(54) USE OF EXTRACT FROM RABBIT SKIN INFLAMED BY VACCINIA VIRUS IN TREATMENT OF CANCER

(71) Applicant: Mega Winning Limited, Hong Kong (CN)

(72) Inventor: Shing Hing Lau, Hong Kong (CN)

(73) Assignee: Mega Winning Limited, Hong Kong (CN)

( * ) Notice: Subject to any disclaimer, the term of this patent is extended or adjusted under 35 U.S.C. 154(b) by 841 days.

(21) Appl. No.: 17/618,543

(22) PCT Filed: Jun. 14, 2019

(86) PCT No.: PCT/CN2019/091337
§ 371 (c)(1),
(2) Date: Jan. 13, 2022

(87) PCT Pub. No.: WO2020/248240
PCT Pub. Date: Dec. 17, 2020

(65) Prior Publication Data
US 2022/0354900 A1    Nov. 10, 2022

(51) Int. Cl.
| | | |
|---|---|---|
| A61K 35/36 | (2015.01) | |
| A61K 31/513 | (2006.01) | |
| A61K 31/675 | (2006.01) | |
| A61K 31/7068 | (2006.01) | |
| A61K 31/7072 | (2006.01) | |
| A61P 35/00 | (2006.01) | |

(52) U.S. Cl.
CPC ............ *A61K 35/36* (2013.01); *A61K 31/513* (2013.01); *A61K 31/675* (2013.01); *A61K 31/7068* (2013.01); *A61K 31/7072* (2013.01); *A61P 35/00* (2018.01)

(58) Field of Classification Search
None
See application file for complete search history.

(56) References Cited

FOREIGN PATENT DOCUMENTS

| | | |
|---|---|---|
| CN | 1205233 A | 1/1999 |
| CN | 1055249 C | 8/2000 |
| CN | 1493302 A | 5/2004 |
| CN | 1613305 A | 5/2005 |
| CN | 101238116 A | 8/2008 |
| CN | 101732348 A | 6/2010 |
| CN | 109504649 A | 3/2019 |
| EP | 1557171 A | 7/2005 |
| EP | 3957314 A1 | 2/2022 |
| JP | S55-87724 A | 7/1980 |
| JP | 2001-058949 A | 3/2001 |
| WO | 2004060381 A1 | 7/2004 |
| WO | 2010054531 A1 | 5/2010 |
| WO | 2016165102 A1 | 10/2016 |
| WO | 2020211009 A1 | 10/2020 |

OTHER PUBLICATIONS

Emodi et al. (2009) Nature Reviews: Clinical Oncology, vol. 6: 638-647. (Year: 2009).*
Khorwal et al. (2017) Inter. J. Biomed. Advance Res. 8(03): 102-107. (Year: 2017).*
Chinese Patent Office Action for Related Application No. 201980097494.0 dated Mar. 8, 2023 (9 pages, including an English statement of relevance).
Chen, et al., "Analgecine enhances the anti-tumor response of radiotherapy by increasing apoptosis and cell cycle arrest in non-small cell lung cancer," Impact Journals, Oncotarget, vol. 8, No. 46, 2017 (pp. 80730-80740).
Yue, et al., "Antitumor activity of extracts from rabbit skins inflamed by Viccinia virus vaccine in vitro," J Int Pharm Res, vol. 45, No. 8, Aug. 2018 (6 pages).
Japanese Patent Office Action for Related Application No. 2021-562049 dated Aug. 1, 2023 (9 pages, including English translation).
Gabrielyan et al., "Cerebral injuries caused by platelet and leukocyte activation and their correction with neurotropin," Experimental Biology and Medicine 112(10):391-393, 1991.
European Patent Office Extended Search Report for Application No. 19924869.1 dated Nov. 7, 2022 (18 pages).
Mori et al., "Effect of a Non-Protein Fraction from an Extract of the Inflamed Skin of Rabbits Inoculated with Vaccina Virus Neurotropin on Meth A-Induced Delayed Type Hypersensitivity", Japan J. Pharmacol., 1990, vol. 54, pp. 468-472.
Hata et al., "Effect of neurotropin on SART stress (stress caused by alteration of rhythms in environmental temperature) in mice and rats", Medline, 1975, abstract, 1 page.
Gabrielian et al., "Cerebrovascular Injuries Induced by Activation of Platelets and Leukocytes in Vivo and Their Correction by Neurotropin", Japan J. Pharmacol., 1992, vol. 60, pp. 51-54.
Yoshiyama et al., "A Boy with Hemophilia and AIDS-Related Complex Treated with Neurotropin A Neuroimmunomodulator", ACTA Paediatricia Japonica, 2009, vol. 30, No. 3, pp. 319-321.
European Patent Office Extended Search Report for Application No. 19932445.0 dated Dec. 22, 2022 (11 pages).
Mizushima et al., "Antitumor Therapeutic Effect of Neurotropin on Transplanted Tumors in Rats", Oncology, vol. 41, 1984, pp. 289-292.
Tomiyama et al., "Antitumor activity of an extract neurotropin isolated from the inflamed skin of rabbits inoculated with vaccinia virus", Cancer and Chemotherapy, 1984, vol. 11, No. 10, abstract, 1 page.

(Continued)

*Primary Examiner* — Russell G Fiebig
(74) *Attorney, Agent, or Firm* — Michael Best & Friedrich LLP

(57) ABSTRACT

The present invention relates to the therapeutic use of extract from rabbit skin inflamed by vaccinia virus. More specifically, the present invention relates to the use of the extract for preventing or treating cancer, or the use of the extract for stimulating secretion of cytokine by somatic cells in a patient. In addition, the present invention also relates to a drug combination comprising the extract as the first anti-cancer agent and a second anticancer agent as well as its use for preventing or treating cancer.

3 Claims, 4 Drawing Sheets

(56) References Cited

OTHER PUBLICATIONS

Toge et al., "Enhancement of antitumor activity of Propionibacterium avidum in combined with neurotropin in tumor bearing mice", Cancer and Chemotherapy, 1983, vol. 10, No. 11, abstract, 1 page.
Hata et al., "Changes in Platelet Count and Related Parameters in SART-Stressed Mice and the Action of Administered Neurotropin," Japan J. Pharmacol., 1988, vol. 47. No. 4., pp. 349-356.
Lirong et al., "Radiation protection effect and its mechanism of multiple nilestriol administrations on the mice with bone marrow type of acute radiation syndrome", Chinese Journal of Radiological Medicine and Protection, 2016, Issue 6, pp. 412-418.
International Search Report and Written Opinion for Application No. PCT/CN2019/083027, dated Mar. 3, 2020 (9 pages).
Japanese Patent Office Notice of Reasons for Refusal for Application No. 2021-574202, dated Oct. 16, 2023 (9 pages, including English Translation).
Miki, T. et al., "A transition of chemotherapeutic and other agents for treatment of prostate cancer," Japanese Journal of Urological Surgery, 2013, 26(5), p. 799-802 (5 pages).
Shionogi & Co., Ltd., package insert for Endoxan for Injection 100mg/Endoxan for Injection 500mg, 17th Edition, Mar. 2019 (7 pages).
Yue Qi, et al., "Antitumor Activity of Extracts from Rabbit Skins Inflamed by Viccinia Virus Vaccine in vitro," International Journal of Pharmaceutical Research, vol. 45. No. 8., pp. 597-602 (Aug. 31, 2018).
Xue Chen, et al., "Analgecine Enhances the Anti-tumor Response of Radiotherapy by Increasing Apoptosis and Cell Cycle Arrest in Non-Small Cell Lung Cancer," Oncotarget, vol. 8, No. 46, pp. 80730-80740 (Aug. 7, 2017).
International Search Report for corresponding International Application No. PCT/CN2019/091337, dated Mar. 16, 2020.
Japanese Patent Office Action for Related Application No. 2021-574202 dated Apr. 25, 2023 (9 pages, English translation included).
Gabrielian, et al., "Cerebrovascular Injuries Induced by Activation of Platelets and Leukocytes in Vivo and Their Correction by Neurotropin," Japan J. Pharmacol., vol. 60, 1992 (p. 51-54).
Hata, et al., "Changes in Platelet Count and Related Parameters in SART-Stressed Mice eand the Action of Administered Neurotropin," Japan. J. Pharmacol., vol. 47, 1988, (p. 349-356).
Japanese Patent Office Action for Related Application No. 2021562049 dated Mar. 7, 2023 (4 pages, including an English statement of relevance).
Matsui, et al., Side effects and supportive care in lung cancer chemotherapyaHistory of Medicine, vol. 157, No. 9, 1991 (p. 555-558).
Mori, et al., "Effect of a Non-Protein Fraction from an Extract of the Inflamed Skin of Rabbits Inoculated with Vaccinia Virus (Neurotropin) on Meth A-Induced Delayed Type Hypersensitivity," Japan J. Pharmacol. vol. 54, 1990 (5 pages).
Takeuchi et al., "Effect of neurotropin on lymphocytes impaired by chemotherapy," Medicine and Biology, 1981 vol. 103, No. 6 (p. 565-569).
Tomitaro, et al., "Effects of SART on stress symptoms in mice and rats: The role of Neurotropin," Folia Pharmacol. Japon, vol. 71, 1975 (p. 211-220).
Yamaguchi, "Bone marrow suppression and hematological toxicity," Japanese Clinical One, 2014, vol. 72, No. 2, (p. 531-535).
Yanagihara Shinta Takao, "Immunopharmacological Actions of Neurotropin (Part 2)—Influence on Graft-versus-host reaction Yukiya," Folia Pharmacological Japonica (Folia Pharmacol. Japon.), 1981, vol. 78 (p. 451-458).
Yoshi et al., "Immunopharmacological Actions of an Extract Isolated From Inflamed Skin of Rabbits Inoculated With Vaccinia Virus (Neurotropin); Enhancing Effect on Delayed Type Hypersensitivity Response Through the Induction of LYT-1+2-T Cells", Int. J. Immunopharmac., vol. 9, No. 4, pp. 443-451, 1987 (9 pages).
European Patent Office Action for Application No. 19932445.0 dated Jun. 13, 2025 (11 pages).

* cited by examiner

1. Control Group
2. Lepalvir Group (0.02U/g)
3. Cyclophosphamide Low-Dose Group (10mg/kg)
4. Cyclophosphamide High-Dose Group (20mg/kg)
5. Combined Administration Group (Lepalvir+Cyclophosphamide) 0.02U/g   10mg/kg

USE OF EXTRACT FROM RABBIT SKIN INFLAMED BY VACCINIA VIRUS IN TREATMENT OF CANCER

FIELD OF INVENTION

The invention relates to the field of medicine. Specifically, the present invention relates to novel therapeutic use of extract from rabbit skin inflamed by vaccinia virus. More specifically, the present invention relates to the use of the extract for preventing or treating cancer. The present invention also relates to the use of the extract for stimulating secretion of cytokine by somatic cells in a patient. In addition, the present invention also relates to a drug combination comprising the extract as the first anticancer agent and further anticancer agent(s) as well as its use for preventing or treating cancer.

BACKGROUND ART

Regardless of whether in developed or developing countries, cancer is the disease with the highest mortality rate, and its mortality and morbidity are still increasing. Therefore, there is a huge demand for anti-tumor drugs in the market.

The anti-tumor drugs that have been developed can kill or inhibit cancer cells in different ways to achieve the purpose of treating malignant tumors. For example, anti-tumor drugs can directly inhibit the division of cancer cells (such as cytotoxic agents), activate the immune system to recognize and eliminate cancer cells (such as cellular immunotherapy, antibody therapy, cytokine therapy, etc.), and inhibit angiogenesis required for tumor growth (e.g., angiogenesis inhibitors), or target tumor-related cell transduction signals (e.g., inhibit tyrosine kinase activity, inhibit farnesyl transferase activity, inhibit MAPK signal transduction pathway, etc.).

In China, most of the chemotherapeutic agents currently in use belong to the class of cytotoxic agents with serious side effects. Finding safe and effective anti-tumor drugs with low toxic side effects has become a major challenge for scientists and clinical medical workers.

In recent years, more and more immunotherapies have been clinically applied and promoted, and cytokine therapy is one of the important categories of immunotherapy (see Li Chuan et al., International Journal of Oncology, Volume 40, Issue 8, August 2013). Cytokines (such as interferon IFN, interleukin IL, and tumor necrosis factor TNF) can directly stimulate immune effector cells and stromal cells at the tumor site to enhance the recognition of tumor cells by cytotoxic effector cells. Therefore, their immunomodulatory function allows them to be used as drugs to activate the immune response against cancer cells. In addition, drugs that stimulate immune cells to release these cytokines are also expected to activate anti-tumor immune response.

In addition, it would be advantageous to seek a combination therapy containing two or more different anti-tumor drugs, since such a combination therapy may produce a synergistic effect in the treatment of cancer and may reduce the toxicity and side effects of anti-cancer therapy.

As used herein, "the extract from rabbit skin inflamed by vaccinia virus" refers to the active substances extracted from the rabbit skin inflamed by vaccinia virus, as described in Chinese Patent NO. ZL98103220.6 (Chinese Patent Announcement NO. CN1055249C), the entirety of which is incorporated herein by reference. Such extract from rabbit skin inflamed by vaccinia virus is commercial available, with trade name of Lepalvir, which is manufactured by Vanworld Pharmaceutical (Rugao) Co. Ltd. The extract from rabbit skin inflamed by vaccinia virus and its pharmacological effects are also described in WO2010/054531, the entirety of which is incorporated herein by reference. In addition, PCT/CN2019/083027 describes the use of extract from rabbit skin inflamed by vaccinia virus for the treatment of hematopoietic system damage, and the entire content of this application is incorporated herein by reference.

SUMMARY OF THE INVENTION

The object of the present invention comprises providing drugs for preventing, alleviating or treating cancer or tumor, as well as drugs capable of stimulating secretion of cytokine by somatic cells. In addition, the object of the present invention also comprises providing a drug combination with a synergistic effect and its use for the treatment of cancer. The toxicity and side effects of the drug combination for the treatment of cancer are significantly reduced.

One of the technical problems of the present invention is solved by providing extract from rabbit skin inflamed by vaccinia virus, preferably Lepalvir. In addition, one of the technical problems of the present invention is solved by providing a combination of the extract and another anticancer agent, such as a cytotoxic agent (for example, an agent that acts on the chemical structure of DNA or an agent that affects nucleic acid synthesis).

In general, the inventors found that extract from rabbit skin inflamed by vaccinia virus can effectively prevent, treat or alleviate cancer or tumor. In addition, the extract combined with other anticancer agent(s) can have a synergistic therapeutic effect, and can reduce the toxicity and side effects of the other anticancer agent(s). Such an effect is particularly advantageous for anti-tumor drugs such as cytotoxic agents, because there has been a desire in the art to reduce the toxicity and side effects of such agents, for example, to reduce their dosage while maintaining or even improving the efficacy. The inventors unexpectedly discovered that the extract can produce anti-tumor synergistic effects together with cytotoxic agents, and significantly reduce the side effects of cytotoxic agents.

Those skilled in the art know that the synergistic effect of an anticancer agent with radiotherapy does not mean that it can also have a synergistic effect with another anticancer agent. There are obviously different cancer treatment mechanisms between radiotherapy and chemotherapy. The essence of radiotherapy is to irradiate the tumor with rays of different energy to change the biomolecular structure of the cancer cells so as to achieve the purpose of shrinking the tumor locally. The side effects of radiotherapy are mainly local reactions, such as red and swollen skin, sore throat, and dry throat. The principle of chemotherapy is usually to block the cell division of cancer cells or to promote the elimination of cancer cells from the body, usually by systemic administration. The side effects of chemotherapy are usually systemic reactions such as bone marrow suppression and gastrointestinal reactions.

When chemotherapy is used to treat cancer, such as cytotoxic agents, the side effects of the drugs often cause the patient to lose weight. Therefore, body weight is a comprehensive indicator of drug toxicity and side effects. In addition, long-term large-scale use of chemotherapeutic agents can inhibit the immune function of the thymus and spleen, and the body's immune system is in a low state, which can easily lead to tumor metastasis and recurrence. The inventors unexpectedly discovered that the extract of the present invention, when used together with chemotherapeutic agents such as cytotoxic agents, can alleviate or prevent the weight loss and spleen index of the subject caused by the agents. Therefore, the present invention also relates to the use of the above-mentioned extract in this respect.

In one aspect, the present invention relates to the use of extract from rabbit skin inflamed by vaccinia virus in the preparation of medicament for preventing or treating cancer in a patient. In one aspect, the present invention relates to extract from rabbit skin inflamed by vaccinia virus for use in the prevention or treatment of cancer. In one aspect, the present invention relates to a method for preventing or treating cancer, the method comprising administering a therapeutically effective amount of extract from rabbit skin inflamed by vaccinia virus to a patient in need thereof.

In one aspect, the present invention relates to the use of extract from rabbit skin inflamed by vaccinia virus in the preparation of a medicament for stimulating secretion of cytokine by somatic cells in a patient. In one aspect, the present invention relates to extract from rabbit skin inflamed by vaccinia virus for use in stimulating secretion of cytokine by somatic cells in a patient. In one aspect, the present invention relates to a method for stimulating secretion of cytokine by somatic cells in a patient, the method comprising administering a therapeutically effective amount of extract from rabbit skin inflamed by vaccinia virus to a patient in need thereof.

In one aspect, the present invention relates to a drug combination for the treatment of cancer, the drug combination comprising extract from rabbit skin inflamed by vaccinia virus as a first anticancer agent and a second anticancer agent. The second anticancer agent is different from the first anticancer agent.

In one aspect, the present invention relates to the use of extract from rabbit skin inflamed by vaccinia virus as a first anticancer agent and a second anticancer agent in the preparation of a drug for preventing or treating cancer in a patient. In one aspect, the present invention relates to extract from rabbit skin inflamed by vaccinia virus (first anticancer agent), for use in combination with an anticancer agent (second anticancer agent) for the prevention or treatment of cancer in a patient. In one aspect, the present invention relates to a method for preventing or treating cancer, the method comprising administering a therapeutically effective amount of extract from rabbit skin inflamed by vaccinia virus as a first anticancer agent and a second anticancer agent to a patient in need thereof. In this aspect, the extract from rabbit skin inflamed by vaccinia virus (first anticancer agent) can be administered simultaneously, separately or sequentially with another anticancer agent (second anticancer agent). The second anticancer agent is different from the first anticancer agent. In this aspect, the second anticancer agent may be cyclophosphamide or 5-fluorouracil.

In one aspect, the present invention relates to a pharmaceutical composition comprising extract from rabbit skin inflamed by vaccinia virus and optionally a pharmaceutically acceptable carrier, adjuvant or excipient. In one aspect of the present invention, the pharmaceutically acceptable carrier, adjuvant or excipient are those that formulate the drug into an oral formulation or an injection. In one aspect, the extract from rabbit skin inflamed by vaccinia virus is formulated into an oral formulation or an injection, preferably an intramuscular injection, intraperitoneal injection, IP injection, subcutaneous injection or intravenous injection. In one aspect, the extract from rabbit skin inflamed by vaccinia virus is Lepalvir. The pharmaceutical composition may also comprise a second anticancer agent.

As used herein, "cancer" may include, but not limited to, neoplasia, tumor, metastasis, or any disease or disorder characterized by uncontrolled somatic cell growth in a patient. The cancer may be primary or metastatic cancer. In addition, cancer may include solid tumors and hematological malignancies such as leukemia and lymphoma. Examples of cancers include liver cancer, lung cancer, cervical cancer, cholangiocarcinoma, bladder cancer, brain cancer, bone cancer, breast cancer, head and neck cancer, colorectal cancer, large intestine cancer, gastric cancer, esophageal cancer, bile cancer, hepatocellular carcinoma, kidney cancer, multiple myeloma, nasopharyngeal carcinoma, oral cancer, pancreatic cancer, ovarian cancer, ureteral cancer, pituitary adenoma, urinary tract cancer, prostate cancer, small cell lung cancer, squamous cell carcinoma, endometrial cancer, leukemia, lymphoma, neuroblastoma, retinoblastoma, Ewing sarcoma, soft tissue sarcoma, glioma, skin cancer or melanoma. In the present invention, the cancer is preferably liver cancer, such as hepatocellular carcinoma; lung cancer, such as small cell lung cancer or non-small cell lung cancer; or cervical cancer.

As used herein, "cytokine" refers to a category of proteins with a wide range of biological activities that are synthesized and secreted by immune cells (such as monocytes, macrophages, T lymphocytes, B lymphocytes, NK cells, etc.) and certain non-immune cells (such as endothelial cells, epidermal cells, fibroblasts, etc.) through stimulation. Cytokines can include interleukin (IL) and interferon (IFN). The cytokines involved in the present invention generally refer to cytokines related to cancer treatment, including IFN, such as IFN-$\alpha$, IFN-$\beta$, IFN-$\gamma$, IFN-k; and IL, such as IL-2, IL-4, IL-12. Preferably, the cytokine is selected from IL-2, IFN-$\gamma$, IL-4 or IL-12. Therefore, somatic cells that secrete cytokines generally refer to immune cells, endothelial cells, epidermal cells, fibroblasts, etc., and immune cells are preferred. Immune cells may comprise lymphocytes, monocytes, macrophages, NK cells, granulocytes, mast cells, dendritic cells, etc., and lymphocytes are preferred. Lymphocytes may comprise T lymphocytes, B lymphocytes, and K lymphocytes, where T lymphocytes may be peripheral blood lymphocytes, lymph node lymphocytes, and splenic lymphocytes. In addition, T lymphocytes can comprise three subgroups of cytotoxic T cells, helper T cells, and suppressor T cells.

As used herein, "patient" can refer to mammals, including companion animals, laboratory animals, livestock animals and the like. In the present invention, the "patient" is preferably a human.

In the present description, "anticancer agent", "anti-tumor drug" and "anticancer agent treatment" can be used interchangeably, and refer to drug treatment practiced against cancer or tumor in a patient. The anticancer agent described herein, especially the second anticancer agent, may comprise chemotherapeutic agent and immunotherapeutic agent. Alternatively, anticancer agent may comprise small molecule chemical drug and macromolecular biological drug. Preferably, anticancer agent comprises cytotoxic agent, such as an agent that acts on the chemical structure of DNA or an agent that affects nucleic acid synthesis (i.e., antimetabolites).

Examples of agents that act on the chemical structure of DNA comprise alkylating agents or pharmaceutically acceptable salts thereof. The alkylating agent may comprise nitrogen mustards or a pharmaceutically acceptable salt thereof.

Nitrogen mustard agent is a general term for $\beta$-chloroethylamine compounds, and its structure can be divided into two parts: the alkylation part and the carrier part. The alkylation part is a functional group with anti-tumor activity; and the carrier part mainly affects the pharmacokinetic properties such as the absorption and distribution of the agent in the body. Nitrogen mustard agent can be divided into fatty nitrogen mustard, aromatic nitrogen mustard, amino acid nitrogen mustard, steroidal nitrogen mustard or heterocyclic nitrogen mustard or a pharmaceutically acceptable salt thereof. The heterocyclic nitrogen mustard may comprise cyclophosphamide, ifosfamide, 4H-peroxocyclophosphamide, defosfamide, mafosfamide, perfosfamide, trifosfamide or a pharmaceutically acceptable salt thereof, preferably cyclophosphamide. In addition, examples of fatty nitrogen mustards comprise nitrogen mustard hydrochloride; examples of aromatic nitrogen mustards comprise chlorambucil; examples of amino acid mustard comprise melphalan; examples of steroidal nitrogen mustards comprise prednimustine and estramustine phosphate; and examples of heterocyclic nitrogen mustard comprise uraphetin, uramustine, thyminalkylamine, cyclophosphamide, and the like.

Examples of agents that affect nucleic acid synthesis comprise thymidylate synthase inhibitors or pharmaceutically acceptable salts thereof. Thymidylate synthase (TS) is a homodimeric cytoplasmic enzyme composed of the same subunits. It participates in the initial synthesis process of thymine nucleotides required for DNA biosynthesis in the body and is the rate-limiting enzyme of this process. Inhibition of TS activity will cause the loss of thymine in tumor cells, so that intracellular DNA synthesis cannot proceed normally, subsequently leading to defective DNA synthesis, lysis and cell apoptosis. The thymidylate synthase inhibitor may comprise a pyrimidine antagonist (pyrimidine analog) or a pharmaceutically acceptable salt thereof. The pyrimidine antagonist can be selected from 5-fluorouracil, capecitabine, tegafur, tegadifur, carmofur, uracil-tegafur, furtulon, floxuridine, doxifluridine or a pharmaceutically acceptable salt thereof, preferably 5-fluorouracil.

As used herein, "pharmaceutically acceptable salt" refers to a conventional non-toxic salt formed by an active ingredient of an anticancer agent through an acid-base reaction. For example, conventional non-toxic salts comprise salts derived from inorganic acids such as hydrochloric acid, hydrobromic acid, sulfuric acid, sulfamic acid, phosphoric acid, nitric acid, etc., and also comprise salts prepared from organic acids such as acetic acid, propionic acid, succinic acid, glycolic acid, stearic acid, lactic acid, malic acid, tartaric acid, citric acid, ascorbic acid, pamoic acid, maleic acid, hydroxymaleic acid, phenylacetic acid, glutamic acid, benzoic acid, salicylic acid, p-aminobenzenesulfonic acid, 2-acetyloxy-benzoic acid, fumaric acid, toluenesulfonic acid, methanesulfonic acid, ethanedisulfonic acid, oxalic acid, isethionic acid, trifluoroacetic acid, etc. Conventional non-toxic salts also comprise salts derived from inorganic bases, including aluminum salts, ammonium salts, calcium salts, copper salts, iron salts, ferrous salts, lithium salts, magnesium salts, manganese salts, manganous salts, potassium salts, sodium salts, zinc salts, etc. Conventional non-toxic salts also comprise salts derived from pharmaceutically acceptable organic non-toxic bases, including salts of primary, secondary, and tertiary amines.

In one aspect of the present invention, the extract from rabbit skin inflamed by vaccinia virus (preferably Lepalvir) is administered to a patient, preferably a human in an amount of about 0.01 to about 20 U/kg, preferably about 0.05 to about 10 U/kg, more preferably about 0.1 to about 5 U/kg, more preferably about 0.5 to about 4 U/kg, more preferably about 0.8 to about 3.2 U/kg. For example, the extract from rabbit skin inflamed by vaccinia virus is administered to a patient, preferably a human in an amount selected from: about 0.01 U/kg, about 0.02 U/kg, about 0.05 U/kg, about 0.1 U/kg, about 0.15 U/kg, about 0.2 U/kg, about 0.3 U/kg, about 0.4 U/kg, about 0.5 U/kg, about 0.6 U/kg, about 0.7 U/kg, about 0.8 U/kg, about 1 U/kg, about 1.5 U/kg, about 2 U/kg, about 2.5 U/kg, about 3 U/kg, about 3.5 U/kg, about 4 U/kg, about 4.5 U/kg, about 5 U/kg, about 5.5 U/kg, about 6 U/kg, about 7 U/kg, about 8 U/kg, about 9 U/kg, about 10 U/kg, about 12 U/kg, about 15 U/kg, about 20 U/kg and the ranges bounded by these numbers. It is known to those skilled in the art that for the dosage, human dose (U/kg or mg/kg)=mouse dose (U/kg or mg/kg)/12.3; or human dose (U/kg or mg/kg)=mouse dose (U/kg or mg/kg)× 0.08 (see Food and Drug Administration, Center for Drug Evaluation and Research (CDER), Pharmacology and Toxicology, Guidance for Industry: Estimating the Maximum Safe Starting Dose in Initial Clinical Trials for Therapeutics in Adult Healthy Volunteers, Page 7, July 2005). The above dosage can be an effective amount for treating cancer in a patient. In one aspect, the extract is administered orally or by injection at the above-mentioned dose, such as intramuscular injection, intraperitoneal injection, IP injection, subcutaneous injection, or intravenous injection.

In one aspect of the present invention, the prepared medicament contains about 0.6 to about 1200 U, preferably about 3 to about 600 U, more preferably about 6 to about 300 U, more preferably about 30 to about 240 U, more preferably about 48 to about 192 U of the extract from rabbit skin inflamed by vaccinia virus. The medicament is used for administration to human, such as an adult. The average weight of an adult is, for example, 60 kg (see Food and Drug Administration, Center for Drug Evaluation and Research (CDER), Pharmacology and Toxicology, Guidance for Industry: Estimating the Maximum Safe Starting Dose in Initial Clinical Trials for Therapeutics in Adult Healthy Volunteers, Page 7, July 2005). Accordingly, the amount of the extract from rabbit skin inflamed by vaccinia virus contained in the medicament prepared by the present invention is, for example, about 0.6 U, about 1.2 U, about 3 U, about 3.5 U, about 3.6 U, about 6 U, about 9. U, about 12 U, about 15 U, about 18 U, about 21 U, about 30 U, about 36 U, about 40 U, about 45 U, about 50 U, about 55 U, about 60 U, about 65 U, About 70 U, about 80 U, about 90 U, about 100 U, about 110 U, about 120 U, about 130 U, about 140 U, about 150 U, about 160 U, about 180 U, about 190 U, about 200 U, about 220 U, about 250 U, about 280 U, about 300 U, about 350 U, about 400 U, about 450 U, about 500 U, about 600 U, about 1000 U, about 1200 U, and the ranges bounded by these numbers. In one aspect, the medicament is prepared as an oral preparation or injection, such as intramuscular injection, intraperitoneal injection, IP injection, subcutaneous injection, or intravenous injection. In one aspect, the medicament or injection is a fixed dose that cannot be divided. In one aspect, the medicament or injection cannot be divided into smaller doses within 1, 2, 3, 4, 5, 6 or 7 days. In one aspect, the medicament or injection is administered only once within 1, 2, 3, 4, 5, 6 or 7 days.

In one aspect of the present invention, the extract from rabbit skin inflamed by vaccinia virus is administered to a patient every about 6 to about 72 hours, preferably about 12 to about 60 hours, more preferably about 24 to about 48 hours, more preferably about 24 to about 36 hours, more preferably about 24 hours. In one aspect, the extract is administered 1-3 times a day, preferably once. In another aspect, the extract is administered as follows: once every two days, once every three days, once every four days, once every five days, once every six days, once a week, once every two weeks, or once a month. In one aspect of the present invention, the extract from rabbit skin inflamed by vaccinia virus is administered to a patient receiving anticancer therapy for at least about 24 months, at least about 12 months, at least about 6 months, at least about 2 months, at least about 1 month, at least about 3 weeks, at least about 2 weeks, at least about 10 days, at least about 7 days, at least about 5 days, at least about 2 days, or at least about 1 day.

In one aspect of the present invention, the extract from rabbit skin inflamed by vaccinia virus as the first anticancer agent can be administered simultaneously, separately or sequentially with other anticancer agent(s) (i.e., the second anticancer agent). The dosage of the extract can be administered as described above. In addition, the other anticancer agent or the second anticancer agent is administered to a patient, preferably a human in an amount of about 0.01 to about 100 mg/kg, about 0.02 to about 50 mg/kg, about 0.03 to about 20 mg/kg, and preferably about 0.05 to about 10 mg/kg, more preferably about 0.1 to about 5 mg/kg, more preferably about 0.2 to about 2.5 mg/kg, more preferably about 0.5 to about 2 mg/kg, more preferably about 0.8 to about 1.6 mg/kg. For example, the anticancer agent is administered to a patient, preferably a human, in an amount selected from the following: about 0.01 mg/kg, about 0.02 mg/kg, about 0.05 mg/kg, about 0.1 mg/kg, about 0.2 mg/kg, about 0.3 mg/kg, about 0.4 mg/kg, about 0.5 mg/kg, about 0.6 mg/kg, about 0.7 mg/kg, about 0.8 mg/kg, about 1 mg/kg, about 1.1 mg/kg, about 1.2 mg/kg, about 1.3 mg/kg, about 1.4 mg/kg, about 1.5 mg/kg, about 1.6 mg/kg, about 1.7 mg/kg, about 1.8 mg/kg, about 2 mg/kg, about 2.5 mg/kg, about 3 mg/kg, about 4 mg/kg, about 5 mg/kg, about 8 mg/kg, about 10 mg/kg, about 15 mg/kg, about 20 mg/kg, about 25 mg/kg, about 30 mg/kg, about 35 mg/kg, about 40 mg/kg, about 50 mg/kg, about 60 mg/kg, about 70 mg/kg, about 80 mg/kg, about 90 mg/kg, about 100 mg/kg and the ranges bounded by these numbers. The other anticancer agent is preferably a cytotoxic agent, preferably an agent that acts on the chemical structure of DNA, more preferably alkylating agent, more preferably nitrogen mustard, more preferably heterocyclic nitrogen mustard, more preferably cyclophosphamide or ifosfamide. Alternatively, the other anticancer agent is a cytotoxic agent, preferably an agent that affects nucleic acid synthesis, more preferably a thymidylate synthase inhibitor, more preferably a pyrimidine antagonist, and more preferably 5-fluorouracil.

In one aspect of the present invention, the other anticancer agent is administered to a patient every about 6 to about 72 hours, preferably about 12 to about 60 hours, more preferably about 24 to about 48 hours, more preferably about 24 to about 36 hours, more preferably about 24 hours. In one aspect, the other anticancer agent is administered 1-3 times a day, preferably once. In another aspect, the other anticancer agent is administered as follows: once every two days, once every three days, once every four days, once every five days, once every six days, once a week, once every two weeks, or once a month. In one aspect of the present invention, the other anticancer agent is administered to a patient receiving anticancer therapy for at least about 24 months, at least about 12 months, at least about 6 months, at least about 2 months, at least about 1 month, at least about 3 weeks, at least about 2 weeks, at least about 10 days, at least about 7 days, at least about 5 days, at least about 2 days, or at least about 1 day.

In the drug combination of the present invention, the content of extract from rabbit skin inflamed by vaccinia virus can be as defined above. In the drug combination of the present invention, the content of the other anticancer agent or second anticancer agent may be about 0.6 to about 5000 mg, preferably about 3 to about 600 mg, more preferably about 6 to about 300 mg, more preferably about 12-about 150 mg, more preferably about 60 to about 120 mg, more preferably about 48 to about 96 mg. For example, the content of the anticancer agent is: about 0.6 mg, about 0.8 mg, about 1 mg, about 1.5 mg, about 3 mg, about 4 mg, about 5 mg, about 6 mg, about 8 mg, about 10 mg, About 12 mg, about 15 mg, about 20 mg, about 25 mg, about 30 mg, about 35 mg, about 40 mg, about 45 mg, about 50 mg, about 55 mg, about 60 mg, about 70 mg, about 80 mg, about 90 mg, about 100 mg, about 110 mg, about 120 mg, about 130 mg, about 140 mg, about 150 mg, about 200 mg, about 250 mg, about 300 mg, about 350 mg, about 400 mg, about 500 mg, about 600 mg, about 800 mg, about 1000 mg, about 1500 mg, about 2000 mg, about 2500 mg, about 3000 mg, about 3500 mg, about 4000 mg, about 4500 mg or about 5000 mg and the ranges bounded by these numbers. The other anticancer agent is preferably a cytotoxic agent, preferably an agent that acts on the chemical structure of DNA, more preferably alkylating agent, more preferably nitrogen mustard, more preferably heterocyclic nitrogen mustard, more preferably cyclophosphamide or ifosfamide. Alternatively, the other anticancer agent is a cytotoxic agent, preferably an agent that affects nucleic acid synthesis, more preferably a thymidylate synthase inhibitor, more preferably a pyrimidine antagonist, and more preferably 5-fluorouracil. In one aspect, the medicament is prepared as an injection, such as intramuscular injection, intraperitoneal injection, IP injection, subcutaneous injection, or intravenous injection. In one aspect, the medicament or injection is a fixed dose that cannot be divided. In one aspect, the medicament or injection cannot be divided into smaller doses within 1, 2, 3, 4, 5, 6 or 7 days. In one aspect, the medicament or injection is administered only once within 1, 2, 3, 4, 5, 6 or 7 days.

"Drug combination" and "combined drug" as described herein are used interchangeably and refer to the inclusion of two or more different anticancer agents for the prevention or treatment of cancer or tumor. The drug combination of the present invention may be in the form of a kit, such as a kit for the treatment of cancer. For example, the kit comprises a first composition and a second composition, wherein the first composition comprises the extract from rabbit skin inflamed by vaccinia virus of the present invention as the first anticancer agent and the second composition comprises other anticancer agent(s) described herein as the second anticancer agent. Alternatively, the kit comprises a first anticancer agent and a second anticancer agent, wherein the first anticancer agent is the extract of the present invention and the second anticancer agent is the other anticancer agent(s) described herein. In one embodiment, the first and second composition (or the first and second anticancer agent) may be separately packaged in the same or different containers. In one embodiment, the kit may comprise a label or instructions stating that the first composition and the second composition (or the first anticancer agent and the second anticancer agent) are administered in combination to treat cancer.

In the embodiment where the extract from rabbit skin inflamed by vaccinia virus is used alone or in combination with other anticancer agent(s), the treatment for a patient using the extract is achieved by directly inhibiting tumor cell proliferation, stimulating secretion of cytokines (preferably IFN or IL, more preferably IFN-γ, IL-2, IL-4 or IL-12) by somatic cells (preferably immune cells, more preferably lymphocytes), promoting tumor cell apoptosis, inhibiting tumor cell growth, enhancing the immune function against tumor cells in a patient, reducing the viability of tumor cells, reducing the colony-forming ability of tumor cells, inducing the G2/M cell cycle arrest of tumor cells (for example, by reducing the expression level of cyclin A2, cyclin B1 and/or CDK1), increasing Bax expression and/or decreasing Bcl-2 level in tumor cells, activating tumor cell apoptosis signaling pathways (for example, by increasing the expression level of cytochrome C, caspase-3, cleaved caspase-3, caspase-9 and/or p53) or a combination thereof.

Therefore, in one aspect, the present invention relates to the use of extract from rabbit skin inflamed by vaccinia virus in the preparation of a medicament for directly inhibiting tumor cell proliferation, stimulating secretion of cytokines (preferably IFN or IL, more preferably IFN-γ, IL-2, IL-4 or IL-12) by somatic cells (preferably immune cells, more preferably lymphocytes), promoting tumor cell apoptosis, inhibiting tumor cell growth, enhancing the immune function against tumor cells in a patient, reducing the viability of tumor cells, reducing the colony-forming ability of tumor cells, inducing the G2/M cell cycle arrest of tumor cells (for example, by reducing the expression level of cyclin A2, cyclin B1 and/or CDK1), increasing Bax expression and/or decreasing Bcl-2 level in tumor cells, activating tumor cell apoptosis signaling pathways (for example, by increasing the expression level of cytochrome C, caspase-3, cleaved caspase-3, caspase-9 and/or p53) or a combination thereof. In this aspect, the medicament may be an anticancer agent. In one aspect, the present invention relates to extract from rabbit skin inflamed by vaccinia virus, for use in directly inhibiting tumor cell proliferation, stimulating secretion of cytokines (preferably IFN or IL, more preferably IFN-γ, IL-2, IL-4 or IL-12) by somatic cells (preferably immune cells, more preferably lymphocytes), promoting tumor cell apoptosis, inhibiting tumor cell growth, enhancing the immune function against tumor cells in a patient, reducing the viability of tumor cells, reducing the colony-forming ability of tumor cells, inducing the G2/M cell cycle arrest of tumor cells (for example, by reducing the expression level of cyclin A2, cyclin B1 and/or CDK1), increasing Bax expression and/or decreasing Bcl-2 level in tumor cells, activating tumor cell apoptosis signaling pathways (for example, by increasing the expression level of cytochrome C, caspase-3, cleaved caspase-3, caspase-9 and/or p53) or a combination thereof. In one aspect, the present invention relates to a method of directly inhibiting tumor cell proliferation, stimulating secretion of cytokines (preferably IFN or IL, more preferably IFN-γ, IL-2, IL-4 or IL-12) by somatic cells (preferably immune cells, more preferably lymphocytes), promoting tumor cell apoptosis, inhibiting tumor cell growth, enhancing the immune function against tumor cells in a patient, reducing the viability of tumor cells, reducing the colony-forming ability of tumor cells, inducing the G2/M cell cycle arrest of tumor cells (for example, by reducing the expression level of cyclin A2, cyclin B1 and/or CDK1), increasing Bax expression and/or decreasing Bcl-2 level in tumor cells, activating tumor cell apoptosis signaling pathways (for example, by increasing the expression level of cytochrome C, caspase-3, cleaved caspase-3, caspase-9 and/or p53) or a combination thereof, comprising administering a therapeutically effective amount of extract from rabbit skin inflamed by vaccinia virus to a patient in need thereof. In the above aspects, the extract can be used as a first anticancer agent in combination with other anticancer agent(s) (for example, a second anticancer agent, preferably cyclophosphamide or 5-fluorouracil) for the aforementioned use or method.

In an embodiment where the extract from rabbit skin inflamed by vaccinia virus is used in combination with other anticancer agent(s), the use of the extract can reduce the amount or dose of the anticancer agent by at least 1%-99%, such as at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%.

As used herein, "extract from rabbit skin inflamed by vaccinia virus" and "extract from rabbit skin inflamed by vaccinia vaccine" can be used interchangeably, and refers to an extract, which contains active substances and is extracted from the inflamed rabbit skin inoculated with vaccinia virus using such processes as leaching, purification, and refining. This extract is usually a yellow or light yellow liquid, but it can also be dried into a solid. The injection of this extract from rabbit skin inflamed by vaccinia virus is commercially available under the trade name Lepalvir, produced by Vanworld Pharmaceutical (Rugao) Co. Ltd. In one aspect, the preparation method of extract from rabbit skin inflamed by vaccinia virus or Lepalvir is described in Chinese Patent Publication Nos. CN1205233A, CN1613305A and CN1493302A, PCT Publication No. WO2004/060381, and European Patent Publication No. EP1557171, etc., the entirety of which is incorporated herein by reference.

In the preparation of the extract of the present invention, the preparation method comprises using a phenol aqueous solution to extract the inflamed rabbit skin fragments after vaccinia virus inoculation, wherein the phenol concentration is preferably about 1%-10%, preferably about 2%-5%, more preferably about 2% or about 3% phenol aqueous solution at a temperature below about 12° C., for example, about 0-10° C., preferably about 2-8° C., more preferably about 3-6° C., and more preferably about 4° C. In addition, the preparation method also comprises adsorbing aqueous phenol solution-treated extract solution with an adsorbent (for example, activated carbon), and performing desorption under alkaline conditions, wherein the adsorption is preferably under acidic conditions (for example, about pH 3-6, more preferably about pH 4-5, more preferably about pH 4.5), and the desorption is under alkaline conditions of about pH 9-12, preferably about pH 10 or pH 11.

In one aspect, the extract from rabbit skin inflamed by vaccinia virus or Lepalvir can be prepared by a method including the following steps:
 (1) The inflamed rabbit skin after inoculation with vaccinia virus is collected, fragmented, and extracted with an extraction solvent to obtain solution A;
 (2) Solution A is treated with acid and heat to obtain solution B;
 (3) Solution B is treated with alkali and heat to obtain solution C;
 (4) Solution C is subject to adsorption and filtration under acidic conditions, and desorption under alkaline conditions to obtain solution D;
 (5) Solution D is neutralized and heated to obtain solution E;
 (6) Solution E is concentrated to obtain the extract; and
 (7) Optionally the extract is mixed with pharmaceutically acceptable carrier, adjuvant or excipient.

In one aspect, in step (1), the rabbit is inoculated with vaccinia virus; the skin with pox is collected; the skin is fragmented; an aqueous solution of phenol is added, and the skin is soaked at a temperature of lower than about 12° C. (for example, about 0-10° C., preferably about 2-8° C., more preferably about 3-6° C., more preferably about 4° C.) for at least about 12 hours (for example, about 24-90 hours, preferably about 48-72 hours, more preferably about 70 or about 72 hours). The supernatant is obtained by centrifugation, and solution A is obtained by filtration. The phenol concentration in the phenol aqueous solution is about 1%-10%, preferably about 2%-5%, more preferably about 2% or about 3%.

In one aspect, in step (2), the solution A is adjusted to acidic (for example, about pH 4-6, more preferably about pH 4.5-5.5, more preferably about pH 5) with acid (for example, hydrochloric acid), and heated (for example, at about 90-100° C., preferably about 95° C. for at least about 10 minutes, such as about 20-50 minutes, preferably about 30-40 minutes), optionally lowering the temperature (for example, to less than about 50° C., preferably less than about 30° C.), followed by centrifugation to obtain the supernatant, and filtration to obtain solution B. The step (2) can be performed in a nitrogen environment.

In one aspect, in step (3), the solution B is adjusted to alkaline (e.g., about pH 8-10, more preferably about pH 8.5-9.5, more preferably about pH 9 or about pH 9. 2), and heated (for example, at about 90-100° C., preferably about 95° C. for at least 10 minutes, such as about 30-50 minutes, preferably about 30-40 minutes), optionally lowering the temperature (for example, to less than about 50° C., preferably less than about 30° C.), followed by filtration to obtain solution C. The step (3) can be performed in a nitrogen environment.

In one aspect, in step (4), the solution C is adjusted to acidic (for example, about pH 3-6, more preferably about pH 4-5, more preferably about pH 4.5) with an acid (for example, hydrochloric acid), and an adsorbent is added thereto (For example, activated carbon) for soaking (for example, under stirring for at least about 1 hour, preferably about 2-10 hours, more preferably about 4 hours), after which the solution is removed and the adsorbent containing the active ingredient is collected. Subsequently, the above-mentioned adsorbent is added to the eluent (for example, water), and the pH is adjusted to alkaline (for example, about pH 9-12, preferably about pH 10 or pH 11) with a base (for example, sodium hydroxide) to separate the active ingredient from the adsorbent (for example, stirring for at least about 1 hour, preferably 2-10 hours, more preferably 4 hours, followed by filtration, and then washing the adsorbent with water) to obtain solution D. The step (4) can be performed in a nitrogen environment.

In one aspect, in step (5), solution D is adjusted to weakly acidic (for example, about pH 5.5-6.6, preferably about pH 6) with acid (for example, hydrochloric acid) to obtain solution E. Preferably, the step (5) can be performed under aseptic conditions. In one aspect, in step (6), the solution E is concentrated (for example, concentrated under reduced pressure, preferably concentrated by evaporation under reduced pressure, for example, at about 50° C. to 70° C., preferably at about 54° C. to 56° C.), followed by filtration to obtain an extract containing the active ingredient. The step (6) can be performed in a nitrogen environment.

Those skilled in the art understand that the extract of the present invention can also be obtained by inoculating other animal tissues with vaccinia virus. For example, in the present invention, an extract from an inflamed tissue inoculated with vaccinia virus can be used. The tissue may be derived from a mammalian tissue, and the mammal may comprise companion animal, laboratory animal, and livestock animal, such as rabbit, cow, horse, sheep, goat, monkey, mouse, and pig. The tissue may be skin.

DETAILED DESCRIPTION

Figure 1:
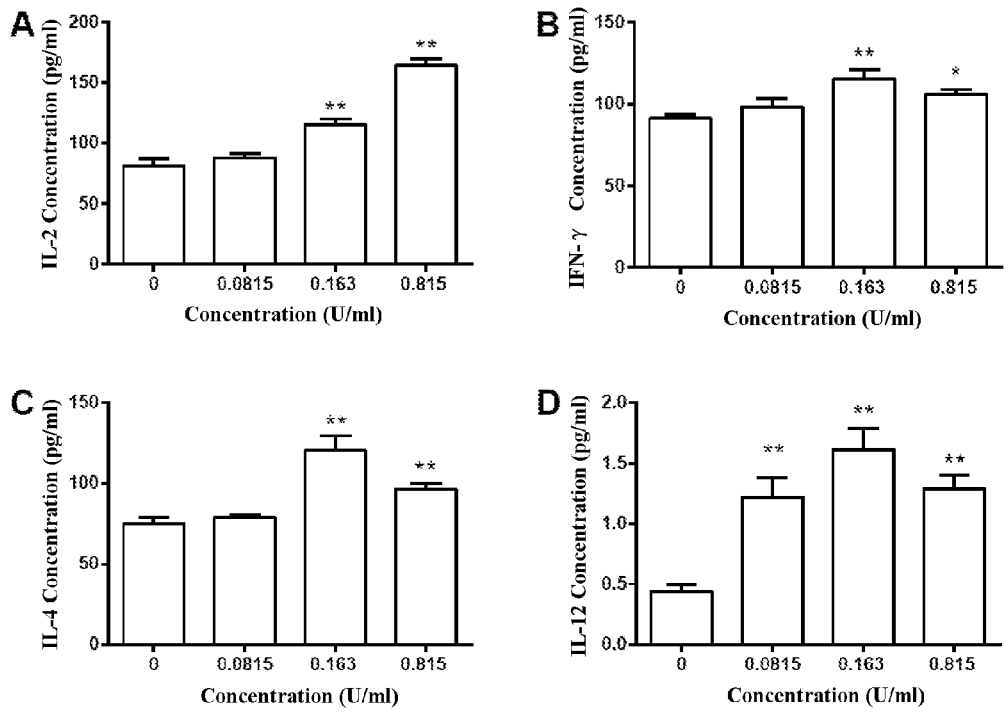
FIG. 1. The effect of Lepalvir on IL-2(A), IFN-γ(B), IL-4(C) and IL-12(D) in the supernatant of mouse splenic lymphocyte. *P<0.05, **P<0.01, compared with the negative control group; □x̄±s, n=3.

Unless otherwise specified, all scientific terms used herein have the same meaning as commonly understood by those of ordinary skill in the art. Exemplary methods and materials are described below, and equivalents can be used. All publications and other references mentioned herein are incorporated by reference in their entirety. The following examples are provided to further illustrate the present invention. The following examples are not intended to limit the scope of the present invention for any reason.

EXAMPLES

Example 1—In Vitro Anti-Tumor Activity of Lepalvir 1.1. The Inhibitory Effect of Lepalvir on Tumor Cell Proliferation Human liver cancer cells HepG2, highly metastatic liver cancer cells LM3, cervical cancer cells HeLa, alveolar epithelial cells A549 and large cell lung cancer cells H460 in logarithmic growth phase were digested with 0.25% trypsin to prepare a cell suspension. The cell concentration was adjusted to $5 \times 10^4$/ml. The cells were inoculated in a 96-well cell culture plate (100 μl per well), and incubated overnight in a constant temperature (37° C.) incubator under 5% $CO_2$. The supernatant was discarded, and pre-prepared complete culture medium containing different concentrations of Lepalvir was added at 5 working concentrations (the final concentration of Lepalvir was 1.63, 0.815, 0.326, 0.163 and 0.0815 U/ml). For the control group (no drug solution added) and the cell-free blank group, 10% FBS-containing DMEM medium or RPMI-1640 medium was added. There were 3 replicate wells for each concentration, and the total volume of each well was 100 μl. After incubation in a constant temperature cell incubator for 24 hours, 10 μl of CCK-8 reagent was added to each well. After further incubation for 1 hour, the absorbance (OD) for each well was measured at 450 nm in an enzyme-linked immunoassay, and the cell proliferation inhibition rate for each group was calculated. Cell inhibition rate (%)=1−[(experimental group OD value-blank group OD value)/(control group OD value-blank group OD value)]×100%.

HepG2, LM3, HeLa, A549 and H460 cells were treated with different concentrations of Lepalvir (the final concentration was 1.63, 0.815, 0.326, 0.163 and 0.0815 U/ml), and the cell proliferation activity was detected using the CCK-8 method. The results were shown in Table 1. Lepalvir had a significant inhibitory effect on the proliferation of the above five types of tumor cells at a higher concentration, especially on HepG2, LM3 and H460 cells. When the concentration of Lepalvir reached 1.63 U/ml, the inhibition rate on HepG2, LM3, and H460 cells reached 58.95%, 55.08%, and 57.28%, respectively, and the inhibition rate on HeLa and A549 cells was slightly lower, being 48.18% and 45.80% respectively. When the concentration of Lepalvir was 0.8151.63 U/ml, compared with the inhibition rate of HeLa and A549 cells, the difference in inhibition rate of HepG2 and LM3 cells was statistically significant (P<0.05).

final concentration of ConA in the splenic lymphocyte suspension for determining IL-4 was 10 mg/L, and the final concentration of LPS in the splenic lymphocyte suspension for determining IL-12 was 10 mg/L). Then the pre-prepared 50 μl different concentrations of Lepalvir was added (the final concentration was 0.815, 0.163 and 0.0815 U/ml). ConA, LPS control groups were established. 3 multiple wells were included for each treatment, and the total volume of each well was 200 μl. After culturing in a 5% $CO_2$, 37° C. constant temperature incubator for 24 hours, the cell suspension was centrifuged at 300×g at room temperature for 5 minutes. The supernatant of each group was then carefully aspirated for further use.

ELISA was used to detect the effects of different concentrations of Lepalvir (the final concentration was 0.815, 0.163 and 0.0815 U/ml) on the secretion of cytokines IL-2, IFN-γ, IL-4 and IL-12 from the collected splenic lymphocyte supernatant. The experimental results showed that the secretion level of the four cytokines increased after different concentrations of Lepalvir was given to splenic lymphocytes. Compared with the control group, Lepalvir 0.0815 U/ml had no significant effect on the secretion level of IL-2, while the IL-2 secretion level of Lepalvir 0.163 and 0.815 U/ml groups was significantly increased, with the effect of Lepalvir 0.815 U/ml group more pronounced (P<0.01, FIG. 1A). The secretion level of IFN-γ and IL-4 in the 0.163 and 0.815 U/ml groups of Lepalvir was significantly increased (P<0.05, P<0.01, FIG. 1B-C), with the effect of the 0.163 U/ml group of Lepalvir more pronounced. However, Lepalvir 0.0815 U/ml had no significant effect on the secretion of IFN-γ and IL-4. The secretion level of IL-12 in three dosing groups of Lepalvir was significantly increased, with the effect of Lepalvir in the 0.163 U/ml group more pronounced (P<0.01, FIG. 1D).

1.3 The Effect of Lepalvir Stimulated Lymphocyte Supernatant on the Proliferation of HepG2 Cells The prepared spleen lymphocyte suspension was obtained. The cell density was adjusted to $5 \times 10^6$/ml (con-

TABLE 1

Inhibition rate of Lepalvir on the proliferation of various tumor cells

| Drug concentration (U/ml) | Inhibition rate (%) | | | | |
|---|---|---|---|---|---|
| | HepG2 cells | LM3 cells | H460 cells | A549 cells | HeLa cells |
| 0.0815 | 2.14 ± 0.30 | 6.77 ± 1.98 | 3.53 ± 1.98 | 4.04 ± 3.00 | 1.58 ± 0.72 |
| 0.163 | 3.88 ± 1.74 | 7.25 ± 1.54 | 3.59 ± 0.87 | 4.08 ± 1.89 | 2.02 ± 1.41 |
| 0.326 | 9.78 ± 1.24 | 9.28 ± 1.13 | 4.48 ± 2.43 | 6.04 ± 2.08 | 4.00 ± 2.32 |
| 0.815 | 22.44 ± 0.28*Δ | 22.20 ± 1.71*Δ | 15.82 ± 2.58 | 20.07 ± 1.02 | 14.29 ± 2.81 |
| 1.63 | 58.95 ± 2.56**## | 55.08 ± 0.64**## | 57.28 ± 0.42**## | 45.80 ± 1.14 | 48.18 ± 2.10 |

Note:
*P < 0.05,
**P < 0.01, compared with Hela group;
P < 0.01, compared with A549 group;
ΔP < 0.05, compared with H460 group;
x̄ ± s,
n = 3

1.2 The Effect of Lepalvir on the Secretion of Cytokines by Mouse Splenic Lymphocytes The prepared spleen lymphocyte suspension was obtained. The cell density was adjusted to $5 \times 10^6$/ml. The cells were inoculated in a 96-well cell culture plate, 100 μl cell fluid per well, and then 50 μl ConA or LPS was added (the final concentration of ConA in the splenic lymphocyte suspension for determining IL-2, IFN-γ was 2 mg/L, the taining ConA at a final concentration of 5 mg/L). The cells were inoculated in a 96-well cell culture plate, 100 μl cell fluid per well. One half of the wells was added with 100 μl Lepalvir (the final concentration of Lepalvir was 0.163 U/ml), and the other half was added with the same volume of RPMI-1640 culture medium containing 10% FBS, with a total volume of 200 μl per well. After culturing in a 5% $CO_2$, 37° C. constant temperature incubator for 24 hours, the cell suspension was centrifuged at 300×g at room temperature for 5 minutes. The supernatant was then carefully aspirated for further use.

The HepG2 cells in the logarithmic growth phase were digested with 0.25% trypsin to prepare a cell suspension. The cell density was adjusted to $5\times10^4$/ml. The cells were seeded in a 96-well cell culture plate with a volume of 100 μl per well, and then cultured in a 5% $CO_2$, 37° C. constant temperature incubator overnight. The supernatant was discarded, and the supernatant of splenic lymphocytes stimulated by Lepalvir was added. According to the experimental design, the following groups were included: experimental group, lymphocyte supernatant treatment group, Lepalvir single-use group, and blank control group. The experimental group was added with different proportions of lymphocyte supernatant which Lepalvir will act on, and the supernatant ratio by volume was 25%, 50%, 75%, 100% respectively. For the lymphocyte supernatant group without the effect of Lepalvir, the balance was DMEM medium containing 10% FBS. For the blank control group, the same volume of DMEM culture medium containing 10% FBS was added. For the Lepalvir single-use group, the final concentration of the drug was 0.163 U/ml. For each treatment, 3 replicate wells were set up, each with a volume of 100 μl. After culturing in a 5% $CO_2$, 37° C. constant temperature incubator for 24 hours, the cells were determined for proliferation activity.

For the cells treated above to be tested, 10 μl of CCK-8 reagent was added to each well. After further incubation for 1.5 hour, the absorbance (OD) for each well was measured at 450 nm in an enzyme-linked immunoassay, and the cell proliferation inhibition rate for each group was calculated.

Figure 2:
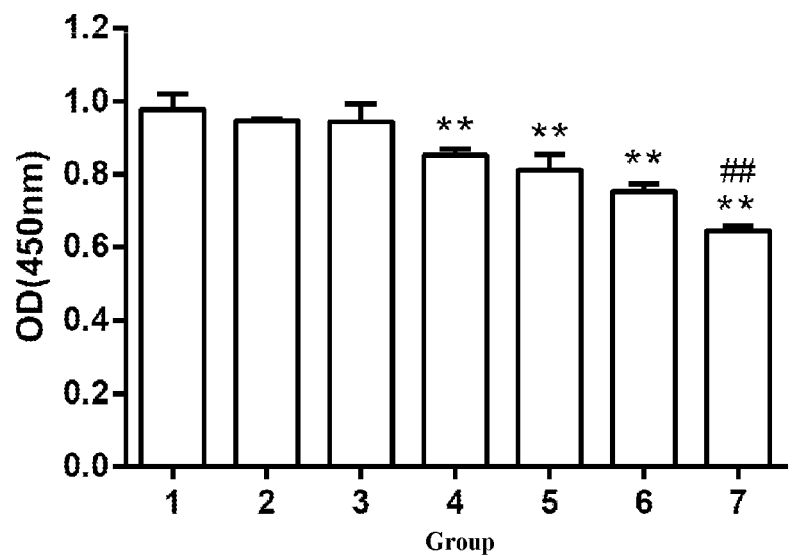
FIG. 2. The effect of Lepalvir stimulated lymphocyte supernatant on the proliferation of HepG2 cells. 1. Negative control group; 2. Lepalvir (0.163 U/ml) single-use group; 3. Lymphocyte supernatant treatment group; 4-7. Treatment groups with the volume of Lepalvir stimulated splenic lymphocyte supernatant being 25%, 50%, 75% and 100% respectively. **P<0.01, compared with the negative control group; ##P<0.01, compared with the Lepalvir single use group; □x̄±s, n=3.

The lymphocyte supernatant contains a variety of immunologically active factors. Based on the above-mentioned ELISA test results, the splenic lymphocyte supernatant stimulated using 0.163 U/ml Lepalvir had an effect on the HepG2 cells. The results were shown in FIG. 2. When the volume of the supernatant was 25%, 50%, 75% and 100%, the inhibition rate on HepG2 cells was 16.06%, 21.10%, 28.46% and 41.70%, respectively, which were all higher than that of the single-use Lepalvir group (the inhibitory rate of the single-use Lepalvir group was 3.87%) at the same concentration. Especially when the supernatant volume reaches 100%, the proliferation of HepG2 cells was significantly inhibited compared with the negative control group ($P<0.01$).

1.4 Conclusion

A. Lepalvir inhibited the proliferation of 5 human derived tumor cells HepG2, LM3, H460, A549 and HeLa in vitro. It was demonstrated that Lepalvir can inhibit the growth of tumor cells, and its inhibitory effect on human liver cancer cells HepG2 and LM3 was even more pronounced.
B. Lepalvir can up-regulate the secretion of IL-2, IFN-γ, IL-4, IL-12 and other cytokines in splenic lymphocytes cultured in vitro in mouse, indicating that Lepalvir can activate lymphocytes, promote the proliferation and differentiation of Th1 and Th2 cells, and enhance the body's cellular immune function.
C. The inhibitory effect of splenic lymphocyte supernatant stimulated by Lepalvir on HepG2 cells was more pronounced than that of Lepalvir alone at the same concentration, further demonstrating that Lepalvir can upregulate cellular immune function by activating lymphocytes and secreting a variety of cytokines, thereby enhancing self-inhibition on tumor cell growth.

Example 2—Pharmacodynamic Study of Lepalvir on Human Liver Cancer-Bearing Nude Mice 2.1 Preparation of Human Liver Cancer LM3 Cells The LM3 cells in the logarithmic growth phase were removed from the 5% $CO_2$, 37° C. constant temperature incubator. The original culture medium was aspirated off, and an appropriate amount of PBS was added for washing to remove residual serum, which was then aspirated off. 1 ml of 0.25% trypsin was added for digestion, and then the cells were placed under a microscope. When the cell shape gradually became round, an appropriate amount of DMEM medium containing 10% FBS was added to stop the digestion. The cells were repeatedly pipetted until complete suspension. The cells were then collected in a 15 ml centrifuge tube, centrifuged at 1500 rpm at room temperature for 8 min. The supernatant was discarded, and an appropriate amount of 0.9% sodium chloride injection was added. The cells were gently pipetted until evenly dispersed. The cells were counted, and placed in an ice box for later use.

2.2 Inoculation of Subcutaneously Transplanted Human Liver Cancer LM3 Tumor

The prepared LM3 cells were adjusted to a cell concentration of $1\times10^7$/ml, and inoculated subcutaneously in the axilla of the right forelimb of eight BALB/C nude mice, each injected with 0.2 ml of cell suspension. The injection site was wiped and disinfected with 75% alcohol. The needle was inserted about 1 cm subcutaneously, and the inoculation site can be seen to bulge rapidly. After inoculation, the needle hole was pressed with a cotton swab for a while, and the nude mouse was put back into the breeding box. When the volume of the subcutaneous tumor of the nude mouse grew to 800-1000 mm$^3$, the mouse was sacrificed by cervical dislocation. After wiping with 75% alcohol, the mouse was moved into an ultra-clean table to remove the tumor tissue aseptically, which was cleaned with 0.9% sodium chloride injection, and then cut with scissors into a small piece of about 1 mm$^3$. The piece was subcutaneously inoculated into 50 BALB/c nude mice under the axilla of the right forelimb using a trocar. The injection site was wiped and disinfected with 75% alcohol. The trocar was subcutaneously inserted into about 1 cm deep, and the inoculation site can be seen to bulge rapidly. After inoculation, press the needle hole was pressed with a cotton swab for a while, and the nude mouse was put back into the breeding box. The mental state, diet, activity, and defecation of the nude mouse were observed every day and the tumor growth was recorded.

2.3 Dosing Groups for Animals

The subcutaneously transplanted human liver cancer LM3 tumor model for fifty BALB/c nude mice was established, and the tumor growth was observed and recorded every day. When the tumor volume grew to 100-300 mm$^3$, the mice were randomly divided and dosed according to the tumor volume. Fifty nude mice were randomly divided into 5 groups, namely blank control group (10 mice), positive control group (10 mice), and low, medium and high-dose Lepalvir group (10 mice in each group). The blank control group was given 0.9% sodium chloride injection, i.p. 0.2 ml/d; the positive control group was given cyclophosphamide, i.p. 20 mg/kg, once every other day; the low-dose Lepalvir group, i.p. 0.01 u/g/d; the medium dose Lepalvir group, i.p. 0.02 u/g/d; the high-dose Lepalvir group, i.p. 0.04 u/g/d. The administration was continued for 15 days. From the first day of administration, the mental state, diet, activity, and defecation of the nude mice were observed every day. The body weight and tumor growth of the nude mice were recorded every three days. The experiment was ended on the 16$^{th}$ day, and the nude mice of each group were weighed. Then, the mouse was sacrificed by cervical dislocation. The tumor tissue and spleen tissue were completely stripped, weighed and measured, and the tumor inhibition rate and spleen index were calculated.

2.4 Determination of Tumor Inhibition Rate and Spleen Index

At the end of the experiment on the 16$^{th}$ day, the nude mice of each group were sacrificed by cervical dislocation, and the subcutaneous tumor tissue was completely stripped out for weighing and measurement. The long diameter (a) and short diameter (b) of the tumor were measured using a vernier caliper. The tumor volume was calculated as follows: tumor volume=a×b×b/2. Tumor inhibition rate (%)=[(average tumor weight of the control group-average tumor weight of the administration group)/average tumor weight of the control group]×100%.

At the end of the experiment on the 16$^{th}$ day, the nude mice were weighed. After the nude mice of each group were sacrificed by cervical dislocation, the spleen tissue was completely stripped and weighed. The formula for calculating the spleen index was as follows: spleen index=spleen weight (mg)/mouse weight (g)×10.

Figure 3:
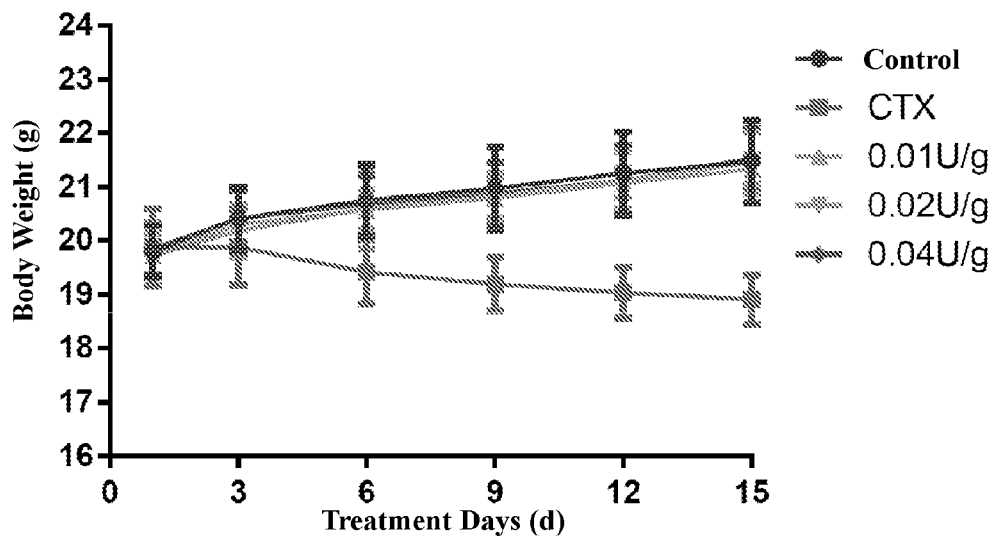
FIG. 3. The effect of Lepalvir on the body weight of nude mice transplanted with LM3 tumor (x̄±s, n=6). CTX: Cyclophosphamide.

2.5 The Effect of Lepalvir on the Body Weight of Nude Mice with Human Liver Cancer For BALB/C nude mice inoculated with LM3 transplanted tumor, the weight of the blank control group was 19.81±0.49 g before the start of the experiment, and the weight at the end of the experiment was 21.48±0.76 g. The body weight profile of the nude mice for the low, medium or high-dose Lepalvir group was substantially the same as the blank control group, and there was no statistical difference between the groups (P>0.05). However, the weight of the nude mice in the cyclophosphamide (CTX) group decreased significantly, and the weight was 18.91±0.46 g at the end of the experiment. Compared with the control group, the difference was statistically significant (P<0.05) (FIG. 3).

Figure 4:
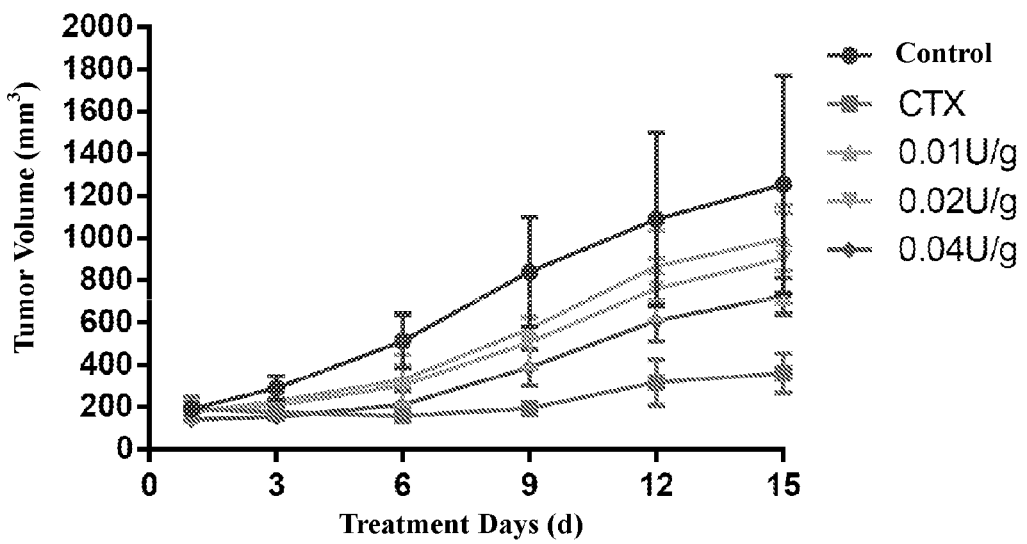
FIG. 4. The effect of Lepalvir on the tumor volume of nude mice transplanted with LM3 tumor (x̄±s, n=6). CTX: Cyclophosphamide.
Figure 5:
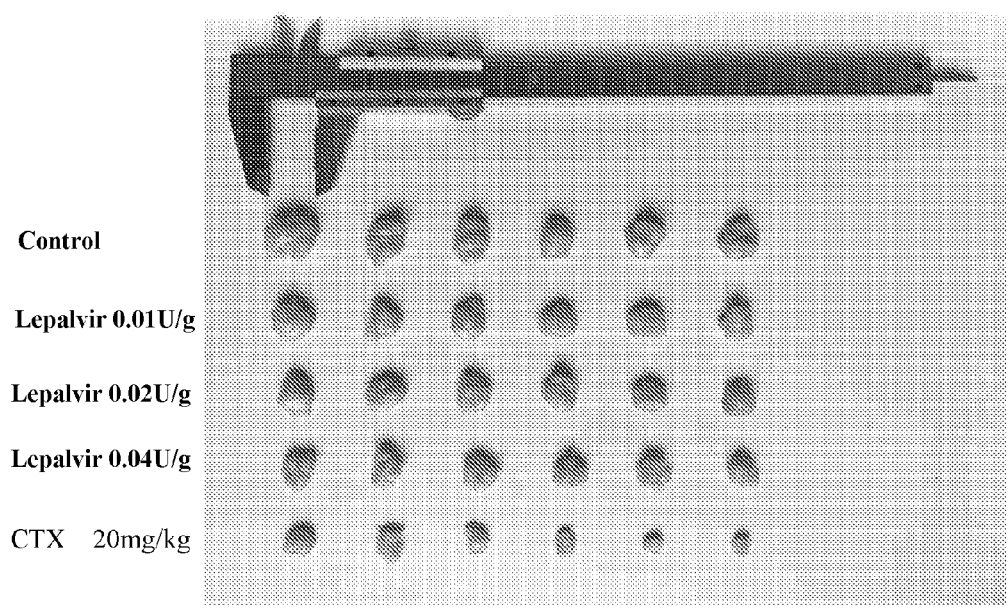
FIG. 5. Results for tumor tissue mass in nude mice subcutaneously transplanted with LM3 tumor. CTX: Cyclophosphamide.

2.6 the Inhibitory Effect of Lepalvir on Subcutaneously Transplanted Tumor of the Nude Mice with Human Liver Cancer Human liver cancer cells LM3 were subcutaneously inoculated into the BALB/C nude mice. When the tumor volume grew to 100-300 mm$^3$ after inoculation, the mice were randomly divided into five groups and dosed according to the tumor volume, namely blank control group, positive control group, and low, medium and high-dose Lepalvir group (10 mice in each group). The long diameter (a) and short diameter (b) of the tumor were measured using a vernier caliper. The tumor volume was calculated and the tumor growth curve was prepared. Judged from the tumor volume growth of each group, the positive control group and the low, medium or high-dose Lepalvir group already had statistical differences compared with the blank control group on the six$^{th}$ day of administration (P<0.05) (FIG. 4); and there was some correlation between the anti-tumor effect and the dose. At the end of the experiment on the $^{16}$th day, the tumor weight of the nude mice in the blank control group was 1.01±0.24 g, the tumor weight in the positive control group was 0.21±0.10 g, the tumor weight in the low-dose (0.01 U/g), medium-dose (0.02 U/g), high-dose (0.04 U/g) Lepalvir group were 0.75±0.13 g, 0.66±0.08 g, and 0.50±0.07 g respectively. The growth inhibition rate on the LM3 transplanted tumor of the nude mice was 25.24%, 34.71%, and 49.86% respectively. The tumor inhibition rate of the positive control group cyclophosphamide was 79.33%. Compared with the blank control group, there were statistical differences in each treatment group (P<0.05 or P<0.01) (Table 2, FIG. 5).

TABLE 2

Effect of Lepalvir on tumor weight and tumor inhibition rate of nude mice transplanted with LM3 tumor

| Group | Number | Dose | Tumor weight (g) | Tumor inhibition rate (%) |
| --- | --- | --- | --- | --- |
| Blank control group | 6 | — | 1.01 ± 0.24 | — |
| Positive control group | 6 | 20 mg/kg | 0.21 ± 0.10** | 79.33 ± 0.10 |
| Low-dose group | 6 | 0.01 U/g | 0.75 ± 0.13* | 25.24 ± 0.13 |
| Medium dose group | 6 | 0.02 U/g | 0.66 ± 0.08** | 34.71 ± 0.08 |
| High dose group | 6 | 0.04 U/g | 0.50 ± 0.07** | 49.86 ± 0.07 |

Note:
*P < 0.05,
**P < 0.01, compared with the blank control group;
$\bar{x} \pm s$,
n = 6

2.7 Effects of Lepalvir on the Immune Organs of Nude Mice with Human Liver Cancer At the end of the experiment on the 16$^{th}$ day, after the nude mice were sacrificed by cervical dislocation, the spleen tissue was completely stripped to remove the excess adhesive tissues, first rinsed with 0.9% sodium chloride injection, and then dried with absorbent paper and weighed. The spleen index was calculated. The results showed (Table 3), the spleen index of the blank control group was 0.84±0.12, the spleen index of the positive control group was 0.70±0.10, the spleen index of the low-dose (0.01 U/g), medium-dose (0.02 U/g) and high-dose (0.04 U/g) group were 1.15±0.05, 1.23±0.07 and 1.17±0.02, respectively.

Compared with the blank control group, there were statistical differences in each treatment group (P<0.01).

TABLE 3

Effects of Lepalvir on the immune organs of nude mice transplanted with LM3 tumor

| Group | Number | Dose | Spleen quality (g) | Spleen index (mg/g) |
|---|---|---|---|---|
| Blank control group | 6 | — | 0.15 ± 0.03 | 0.94 ± 0.12 |
| Positive control group | 6 | 20 mg/kg | 0.12 ± 0.02** | 0.70 ± 0.10** |
| Low-dose group | 6 | 0.01 U/g | 0.21 ± 0.02** | 1.15 ± 0.05** |
| Medium dose group | 6 | 0.02 U/g | 0.23 ± 0.02** | 1.22 ± 0.07** |
| High dose group | 6 | 0.04 U/g | 0.22 ± 0.01** | 1.17 ± 0.02** |

Note:
**$P < 0.01$, compared with the negative control group;
$\bar{x} \pm s$,
n = 6

2.8 Conclusion

A. The BALB/C nude mouse model subcutaneously transplanted with LM3 tumor was successfully established, which has laid the foundation for the in vivo pharmacodynamic study of Lepalvir.
B. Lepalvir had no significant effect on the weight gain of BALB/C nude mouse subcutaneously transplanted with LM3 tumor, showing its high safety characteristics.
C. Lepalvir had a significant inhibitory effect on the growth of BALB/C nude mouse subcutaneously transplanted with LM3 tumor, and had some correlation with the dose, indicating its practical value in cancer treatment.
D. Lepalvir can increase the weight of the immune organ (spleen) of BALB/C nude mouse subcutaneously transplanted with LM3 tumor, and can increase the spleen index of nude mouse, suggesting that Lepalvir can improve the immune function of the body.

Example 3—Pharmacodynamic Study of Lepalvir Combined with Cyclophosphamide on Human Liver Cancer-Bearing Nude Mice See Example 2 for the preparation of human liver cancer LM3 cells and the establishment of BALB/C nude mouse model subcutaneously transplanted with LM3 tumor.

3.1 Dosing Groups for Animals

The subcutaneously transplanted human liver cancer LM3 tumor model for fifty BALB/c nude mice was established, and the tumor growth was observed and recorded every day. When the tumor volume grew to 100-300 mm³, the mice were randomly divided and dosed according to the tumor volume. Fifty nude mice were randomly divided into 5 groups, namely blank control group (10 mice), Lepalvir group (10 mice), low-dose cyclophosphamide group (10 mice), and high-dose cyclophosphamide group (10 mice), Lepalvir combined with cyclophosphamide administration group (10 mice). The control group was given 0.9% sodium chloride injection, i.p. 0.2 ml/d; Lepalvir group, i.p. 0.02 U/g/d; cyclophosphamide low-dose group, i.p. 10 mg/kg, given once every two days; cyclophosphamide high-dose group, i.p. 20 mg/kg, given once every two days; Lepalvir and cyclophosphamide combined administration group, i.p. 0.02 U/g+10 mg/kg, Lepalvir was given once a day, cyclophosphamide was given once every two days. The administration was continued for 15 days. From the first day of administration, the mental state, diet, activity, and defecation of the nude mice were observed every day. The body weight and tumor growth of the nude mice were recorded every three days. The experiment was ended on the $16^{th}$ day, and the nude mice of each group were weighed. Then, the mouse was sacrificed by cervical dislocation. The tumor tissue and spleen tissue were completely stripped, weighed and measured, and the tumor inhibition rate and spleen index were calculated.

3.2 Determination of Tumor Inhibition Rate and Spleen Index

At the end of the experiment on the $16^{th}$ day, the nude mice of each group were sacrificed by cervical dislocation, and the subcutaneous tumor tissue was completely stripped out for weighing and measurement. The long diameter (a) and short diameter (b) of the tumor were measured using a vernier caliper. The tumor volume was calculated as follows: tumor volume=a×b×b/2. Tumor inhibition rate (%)=[(average tumor weight of the control group-average tumor weight of the administration group)/average tumor weight of the control group]×100%.

At the end of the experiment on the $16^{th}$ day, the nude mice were weighed. After the nude mice of each group were sacrificed by cervical dislocation, the spleen tissue was completely stripped and weighed. The formula for calculating the spleen index was as follows: spleen index=spleen weight (mg)/mouse weight (g)×10.

Figure 6:
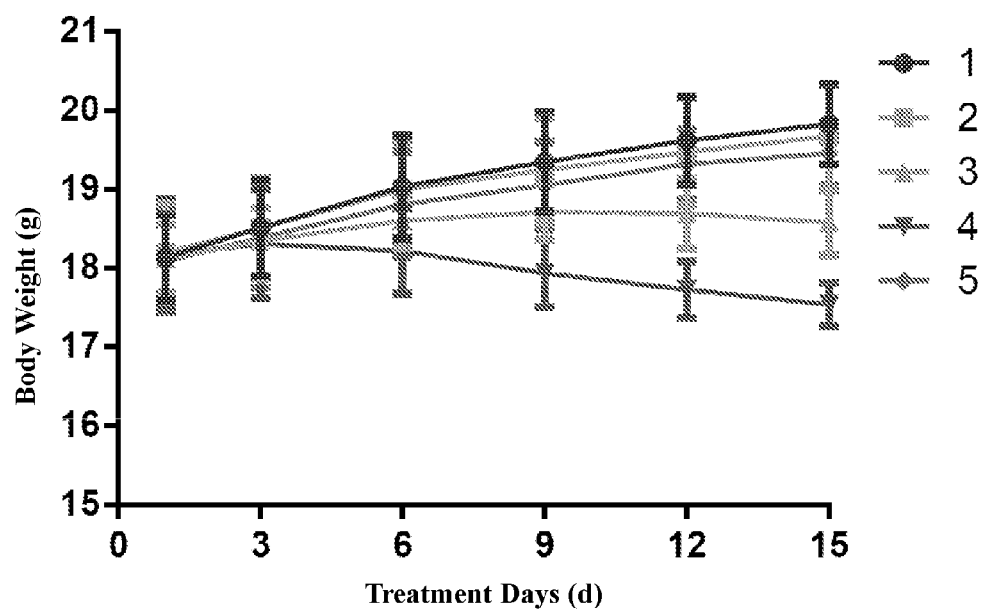
FIG. 6. The effect of Lepalvir combined with cyclophosphamide on the body weight of nude mice transplanted with LM3 tumor (x̄±s, n=6). 1. Control group; 2. Lepalvir group (0.02 U/g); 3. Cyclophosphamide low-dose group (10 mg/kg); 4. Cyclophosphamide high-dose group (20 mg/kg); 5. Lepalvir combined with cyclophosphamide administration group (0.02 U/g+10 mg/kg).

3.3 The Effect of Lepalvir on the Body Weight of Nude Mice with Human Liver Cancer For BALB/C nude mice inoculated with LM3 transplanted tumor, the weight of the control group was 18.13±0.54 g before the start of the experiment, and the weight at the end of the experiment was 19.83±0.51 g. The body weight profile of the nude mice for the Lepalvir group and Lepalvir combined with cyclophosphamide group was substantially the same as the control group, and there was no statistical difference between the groups (P>0.05). At the end of the experiment, the body weight of nude mice in the cyclophosphamide low and high dose groups were 18.58±0.41 g and 17.54±0.28 g, respectively. Compared with the control group, the difference was statistically significant (P<0.05) (FIG. 6).

Figure 7:
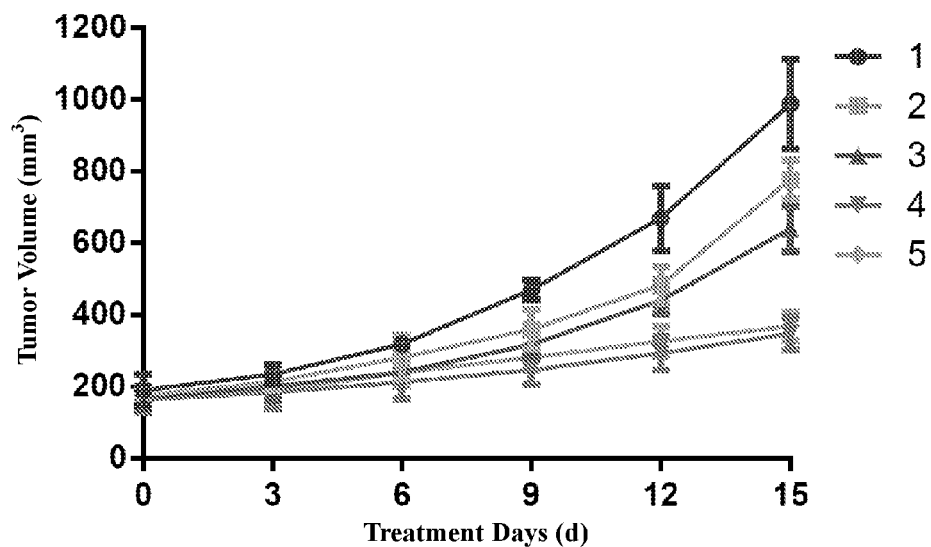
FIG. 7. The effect of Lepalvir combined with cyclophosphamide on the tumor volume of nude mice transplanted with LM3 tumor (x̄±s, n=6). 1. Control group; 2. Lepalvir group (0.02 U/g); 3. Cyclophosphamide low-dose group (10 mg/kg); 4. Cyclophosphamide high-dose group (20 mg/kg); 5. Lepalvir combined with cyclophosphamide administration group (0.02 U/g+10 mg/kg).
Figure 8:
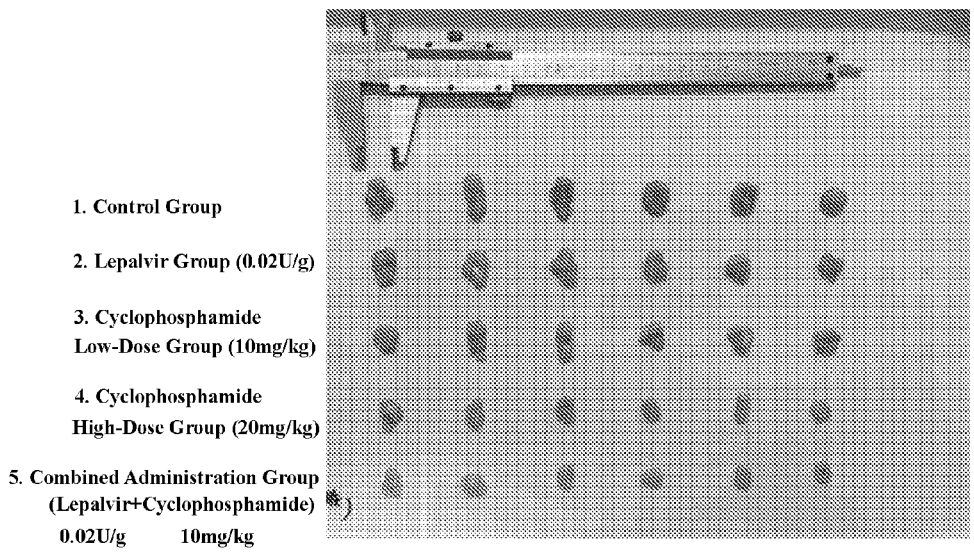
FIG. 8. Results for tumor tissue mass in nude mice subcutaneously transplanted with LM3 tumor.

3.4 The Inhibitory Effect of Lepalvir on Subcutaneously Transplanted Tumor of the Nude Mice with Human Liver Cancer Human liver cancer cells LM3 were subcutaneously inoculated into the BALB/C nude mice. When the tumor volume grew to 100-300 mm³ after inoculation, the mice were randomly divided into five groups and dosed according to the tumor volume, namely control group, Lepalvir group, cyclophosphamide low-dose group, cyclophosphamide high-dose group, and Lepalvir combined with cyclophosphamide group. The long diameter (a) and short diameter (b) of the tumor were measured using a vernier caliper. The tumor volume was calculated and the tumor growth curve was prepared. Judged from the tumor volume growth of each group, Lepalvir group, cyclophosphamide low-dose, high-dose group, and Lepalvir combined with cyclophosphamide group already had statistical differences on the ninth day of administration, compared with the control group (P<0.05) (FIG. 7). At the end of the experiment on the 16$^{th}$ day, the tumor weight of the nude mice in the control group was 0.75±0.04 g, and the tumor weight in the Lepalvir group (0.02 U/g) was 0.58±0.06 g, the growth inhibition rate on the LM3 transplanted tumor of the nude mice was 22.25%; the tumor weight of the cyclophosphamide low-dose group (10 mg/kg) and high-dose group (20 mg/kg) was 0.50±0.02 g and 0.28±0.06 g, respectively, and the tumor inhibition rate was 33.21% and 62.67, respectively %; the tumor weight of Lepalvir combined with cyclophosphamide group (0.02 U/g+10 mg/kg) was 0.29±0.05 g, the tumor inhibition rate was 60.95%, and compared with the tumor weight of the control group, There were statistical differences in each treatment group (P<0.01); compared with the tumor weight of the Lepalvir combined with cyclophosphamide group, there were significant differences between the Lepalvir group and the cyclophosphamide low-dose group (P<0.01) (Table 4, FIG. 8). It can be seen from Table 4 and FIG. 7 that the tumor inhibition rate of the combined administration of Lepalvir and cyclophosphamide was greater than the sum of the tumor inhibition rate of Lepalvir alone plus the tumor inhibition rate of cyclophosphamide alone. This result indicated that the combined use of Lepalvir and cyclophosphamide had a synergistic effect in tumor treatment.

TABLE 4

Effect of Lepalvir combined with cyclophosphamide on tumor weight and tumor inhibition rate of nude mice transplanted with LM3 tumor

| Group | Number | Dose | Tumor weight (g) | Tumor inhibition rate (%) |
| --- | --- | --- | --- | --- |
| Control group | 6 | — | 0.75 ± 0.04 | — |
| Lepalvir group | 6 | 0.02 U/g | 0.58 ± 0.06** | 22.25 ± 4.48 |
| CTX low-dose group | 6 | 10 mg/kg | 0.50 ± 0.02** | 33.21 ± 1.41 |
| CTX high-dose group | 6 | 20 mg/kg | 0.28 ± 0.06** | 62.67 ± 5.81 |
| Lepalvir + CTX | 6 | 0.02 U/g + 10 mg/kg | 0.29 ± 0.05**##ΔΔ | 60.95 ± 4.36 |

Note:
**P < 0.01, compared with the control group;
P < 0.01, compared with the Lepalvirue group;
ΔΔP < 0.01, compared with the cyclophosphamide low-dose group (10 mg/kg);
$\bar{x} \pm s$,
n = 6

3.5 Effects of Lepalvir on the Immune Organs of Nude Mice with Human Liver Cancer At the end of the experiment on the 16$^{th}$ day, after the nude mice were sacrificed by cervical dislocation, the spleen tissue was completely stripped to remove the excess adhesive tissues, first rinsed with 0.9% sodium chloride injection, and then dried with absorbent paper and weighed. The spleen index was calculated. The results showed (Table 5), compared with the spleen index of the control group, there were statistical differences in the Lepalvir group (0.02 U/g), the cyclophosphamide low (10 mg/kg) and high dose group (20 mg/kg). There was no significant difference in the Lepalvir combined with cyclophosphamide group (0.02 U/g+10 mg/kg) (P>0.05). Compared with the spleen index of the combined administration group, there were statistical differences in the Lepalvir group, the cyclophosphamide low (10 mg/kg) and high dose group (P<0.05).

TABLE 5

Effects of Lepalvir combined with cyclophosphamide on the immune organs of nude mice subcutaneously transplanted with LM3 tumor

| Group | Number | Dose | Spleen quality (g) | Spleen index (mg/g) |
| --- | --- | --- | --- | --- |
| Control group | 6 | — | 0.21 ± 0.02 | 1.16 ± 0.16 |
| Lepalvir group | 6 | 0.02 U/g | 0.24 ± 0.01**## | 1.22 ± 0.13**## |
| CTX low-dose group | 6 | 10 mg/kg | 0.19 ± 0.01*# | 1.08 ± 0.12*# |

TABLE 5-continued

Effects of Lepalvir combined with cyclophosphamide on the immune organs of nude mice subcutaneously transplanted with LM3 tumor

| Group | Number | Dose | Spleen quality (g) | Spleen index (mg/g) |
|---|---|---|---|---|
| CTX high-dose group | 6 | 20 mg/kg | 0.17 ± 0.01**## | 1.01 ± 0.08**## |
| Lepalvir + CTX | 6 | 0.02 U/g + 10 mg/kg | 0.21 ± 0.01 | 1.14 ± 0.09 |

Note:
*$P < 0.05$,
**$P < 0.01$, compared with the blank control group;
$P < 0.05$,
$P < 0.01$, compared with the Lepalvir combined with cyclophosphamide group;
$\bar{x} \pm s$,
n = 6

3.6 Conclusion

A. Lepalvir can reduce the toxic and side effects of cyclophosphamide on the body and improve the health of the body.
B. Lepalvir had an anti-tumor synergistic effect on cyclophosphamide, and Lepalvir can be used in combination with cyclophosphamide to reduce the amount of cyclophosphamide to achieve the same anti-tumor effect. This indicated the practical value of Lepalvir as an anti-cancer adjuvant.
C. Compared with the group administered with the same dose of cyclophosphamide alone, the combined administration of Lepalvir and cyclophosphamide can significantly increase the spleen index and reduce the inhibitory effect of cyclophosphamide on the spleen. Lepalvir can improve the body's immune function and play a role in reducing toxicity and increasing efficacy of cyclophosphamide.

The invention claimed is:

1. A method for treating cancer in a human patient in need thereof, the method comprises administering a therapeutically effective amount of a first anticancer agent and a therapeutically effective amount of a second anticancer agent;
   wherein the first anticancer agent is an extract from rabbit skin inflamed by vaccinia virus;
   wherein the second anticancer agent is cyclophosphamide;
   wherein the cancer is liver cancer;
   wherein the therapeutically effective amount of the first anticancer agent is about 1.6 U/kg; and
   wherein the therapeutically effective amount of the second anticancer agent is about 0.8 mg/kg.

2. The method of claim 1, wherein the extract from rabbit skin inflamed by vaccinia virus is formulated into an oral formulation or an injection.

3. The method of claim 2, wherein the injection is an intramuscular injection, intraperitoneal injection, subcutaneous injection, or intravenous injection.

* * * * *